United States Patent
Rife, Jr.

(10) Patent No.: US 12,359,381 B2
(45) Date of Patent: Jul. 15, 2025

(54) THERMOELECTRIC POWER GENERATION ON A PAVING MACHINE

(71) Applicant: Caterpillar Paving Products Inc., Brooklyn Park, MN (US)

(72) Inventor: Conwell K. Rife, Jr., Plymouth, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 952 days.

(21) Appl. No.: 17/495,843

(22) Filed: Oct. 7, 2021

(65) Prior Publication Data

US 2023/0109685 A1 Apr. 13, 2023

(51) Int. Cl.
    *E01C 19/23* (2006.01)
    *E01C 19/26* (2006.01)
    *E01C 19/48* (2006.01)

(52) U.S. Cl.
    CPC .......... *E01C 19/238* (2013.01); *E01C 19/264* (2013.01); *E01C 19/48* (2013.01)

(58) Field of Classification Search
    CPC ....... E01C 19/238; E01C 19/264; E01C 19/48
    See application file for complete search history.

(56) References Cited

U.S. PATENT DOCUMENTS

| 4,767,467 A * | 8/1988 | Holland ................. H10N 10/00 136/201 |
| 8,754,614 B2 | 6/2014 | Paryani et al. |
| 9,197,143 B1 * | 11/2015 | Townsend ............... H02J 1/102 |
| 10,716,192 B1 * | 7/2020 | Tsibulevskiy ........... H02J 9/061 |
| 11,394,247 B1 * | 7/2022 | Tsibulevskiy ............. H02J 7/06 |
| 2015/0337504 A1 * | 11/2015 | Jorgensen ............... E01C 19/40 404/114 |
| 2015/0361627 A1 * | 12/2015 | Frelich .................. B60W 10/30 180/65.245 |
| 2020/0071892 A1 * | 3/2020 | Ellwein ............... E01C 19/4833 |
| 2021/0229609 A1 * | 7/2021 | Goutermont ........... B60R 16/03 |

FOREIGN PATENT DOCUMENTS

| CN | 205468772 U | 8/2016 |
| CN | 206204742 U | 5/2017 |
| CN | 106480808 B | 11/2018 |
| CN | 211227979 U | 8/2020 |
| JP | 3737681 B2 | 1/2006 |

* cited by examiner

Primary Examiner — Abigail A Risic

(57) ABSTRACT

An electrically powered paving machine includes a hopper; a screed assembly; a conveying system; one or more batteries configured to power the electrically powered paving machine; a plurality of thermoelectric generators electrically connected to the one or more batteries; a potential thermal energy conversion device electrically connected to the one or more batteries; and processing circuitry. Additionally, the electrically powered paving machine controls charging the one or more batteries using electrical energy generated by one or more of the plurality of thermoelectric generators and the potential thermal energy conversion device.

20 Claims, 8 Drawing Sheets

THERMOELECTRIC POWER GENERATION ON A PAVING MACHINE

FIELD OF THE DISCLOSURE

The present disclosure relates to a paving machine and, more particularly, to a paving machine having thermoelectric power generation on the paving machine.

BACKGROUND

As electric powered vehicles such as sedans and SUVs continue to grow in popularity, other types of vehicles that are traditionally powered by combustion engines are under consideration for a transition to fully electric power. For example, heavy machinery has been considered for fully electric power operation. However, electric powered heavy machinery in particular can consume power at a rate faster than desired for a full day of work. As all types of electric powered vehicles are becoming a reality, a solution is required to overcome this problem.

Chinese Patent Pub. No. CN205468772U (the '772 patent publication) describes a safety warning device for asphalt mixture transport vehicle, which comprises a thermoelectric generator, a lithium battery, and a LED display device. The '772 patent publication also describes that the thermoelectric generator and the LED display device are respectively connected with the lithium battery. According to the '772 patent publication, the thermoelectric generator and the lithium battery are arranged in the flat cubic shell, the cubic shell is arranged on the outer side of the asphalt mixture transport vehicle compartment, the cubic shell is provided with a heat collecting end and a power supply output end, the thin heat conducting layer of the thermoelectric generator serves as the heat collecting end and is used for collecting the heat of the asphalt mixture transport vehicle compartment, and the power supply output end outputs proper current and voltage to supply power for the LED warning device.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, an electrically powered paving machine can include a hopper; a screed assembly; a conveying system; one or more batteries configured to power the electrically powered paving machine; a plurality of thermoelectric generators electrically connected to the one or more batteries; a potential thermal energy conversion device electrically connected to the one or more batteries; and processing circuitry. Additionally, the electrically powered paving machine can control charging the one or more batteries using electrical energy generated by one or more of the plurality of thermoelectric generators and the potential thermal energy conversion device.

In one aspect, a paving machine can include one or more batteries; a plurality of thermoelectric generators electrically connected to the one or more batteries; a potential thermal energy conversion device electrically connected to the one or more batteries; and processing circuitry. Additionally, the paving machine can control charging the one or more batteries using electrical energy generated by one or more of the plurality of thermoelectric generators and the potential thermal energy conversion device.

In one aspect, a thermoelectric generation system can include a paving machine electrically powered by one or more batteries; a plurality of thermoelectric generators electrically connected to the one or more batteries; and processing circuitry. Additionally, the thermoelectric generation system can charge the one or more batteries using electrical energy generated by one or more of the plurality of thermoelectric generators.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
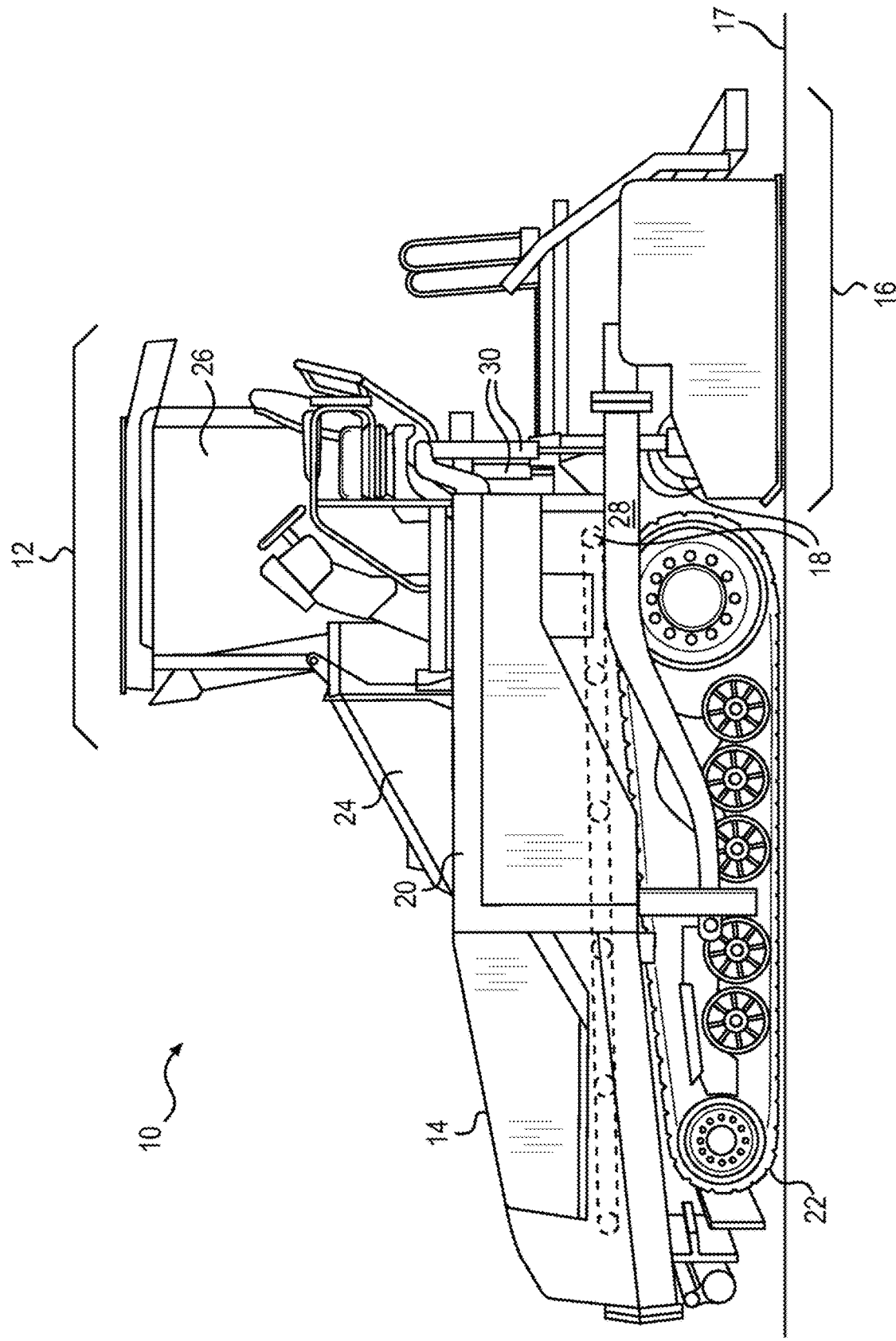
FIG. 1 illustrates a side-view of an exemplary paving machine according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Referring now to the drawings, wherein like reference numerals designate identical or corresponding parts throughout the several views:

Generally, paving machines are used to deposit layers of asphalt onto a roadway or parking lot bed. A paving machine generally includes a hopper that receives heated asphalt, a screed, and a conveying system that moves the heated asphalt from the hopper onto the bed in front of the screed. During operation, the screed is pushed or pulled over the asphalt to level and shape the asphalt into a layer of paving material having a desired thickness and width. The screed is typically connected to the paving machine via a hinged connection and is allowed to "float" on top of the asphalt and use its weight to level and shape the layer. In some applications, the paving machine is connected to and towed by a dump truck supplying the asphalt to the hopper. In other applications, the paving machine includes a tractor that self-powers the paving machine.

FIG. 1 illustrates an exemplary paving machine 10 having a tractor portion 12 carrying a front-mounted hopper 14 and towing a screed assembly 16. A conveying system 18 having belts, chains, and/or augers may be situated to transport paving material (e.g., a hot asphalt mixture) from hopper 14 to screed assembly 16. Screed assembly 16 may then level and shape the material into a layer having a desired thickness and width on top of a work surface 17. In the disclosed example, paving machine 10 is self-powered by way of tractor portion 12. It is contemplated, however, that tractor portion 12 may alternatively be omitted, and hopper 14 and/or screed assembly 16 towed by another machine (e.g., a dump truck), if desired.

Tractor portion 12 may include, among other things, a machine frame 20, a plurality of traction devices 22 (e.g., tracks or wheels—only one shown in FIG. 1) configured to support machine frame 20, a power source (e.g., an engine for a combustion type vehicle or one or more batteries (e.g., energy storage device 410) for a fully electric powered vehicle) 24 configured to drive traction devices 22, and an operator station 26 configured to provide operator control over paving machine 10. Machine frame 20 may support hopper 14, and transmit tractive forces to screed assembly 16 (e.g., by way of tow arms 28—only one shown in FIG. 1). One or more actuators 30 may be connected between machine frame 20 and tow arms 28, and controlled (e.g., for example via operator station 26) to raise, lower, shift, and/or tilt screed assembly 16 relative to machine frame 20. It is also contemplated that screed assembly 16 may generally be free floating, if desired, and only raised or lowered for roading or paving operations, respectively.

Figure 2:
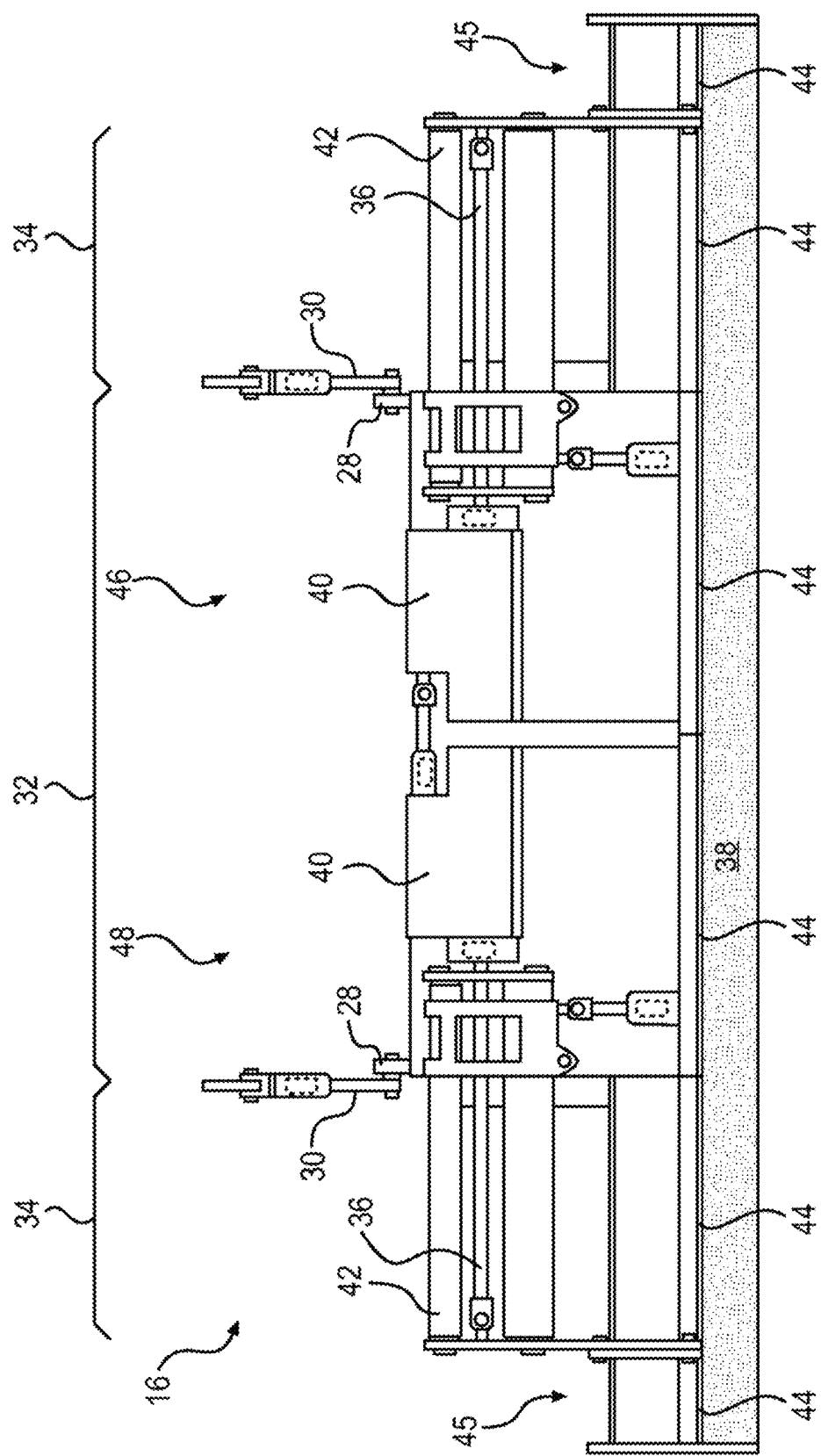
FIG. 2 illustrates an end-view of a screed assembly that may be used in conjunction with the paving machine of FIG. 1 according to one or more aspects of the disclosed subject matter.

As shown in FIG. 2, screed assembly 16 may be a compilation of components that cooperate to shape, level, and compact the asphalt mixture transferred from hopper 14 onto work surface 17 in front of screed assembly 16 by conveying system 18. These components may include a main screed 32 and, in some embodiments, one or more auxiliary screeds 34 that are extendably mounted at opposing ends of main screed 32. Auxiliary screeds 34 may be moved in-and-out relative to main screed 32 by way of one or more hydraulic actuators 36, so as to adjust a width of the resulting asphalt layer 38 laid down by screed assembly 16. Auxiliary screeds 34 may be located immediately adjacent main screed 32, in front of main screed 32, or behind main screed 32 relative to a normal forward traveling direction of paving machine 10. Screed assembly 16 may also include one or more screed extensions 45 that are connectable to auxiliary screeds 34 to increase the width of the resulting asphalt layer 38.

Each of main and auxiliary screeds 32, 34 may include a frame 40, 42, respectively. Frames 40, 42 may be operatively connected to machine frame 20 via tow arms 28. Main and auxiliary screeds 32, 34 may each include one or more screed plates 44. Frame 40 of main screed 32 may be connected directly or indirectly to machine frame 20. For example, frame 40 may be bolted or welded to tow arms 28, and tow arms 28 may in turn be connected to machine frame 20 referring to FIG. 1) by way of actuators 30. When tow arms 28 are connected to machine frame 20 via actuators 30, the operator of paving machine 10 may be able to raise, lower, shift, and/or tilt frame 40 to adjust a location and/or operation of main screed 32. Frame 42 of auxiliary screeds 34 may be connected to frame 40 of main screed 32 and/or to machine frame 20 (e.g., via tow arms 28) via hydraulic actuators 36. Screed extensions 45 may be mechanically connected to auxiliary screeds 34, for example, via bolts or other fasteners, and may also include a screed plates 44.

Figure 3:
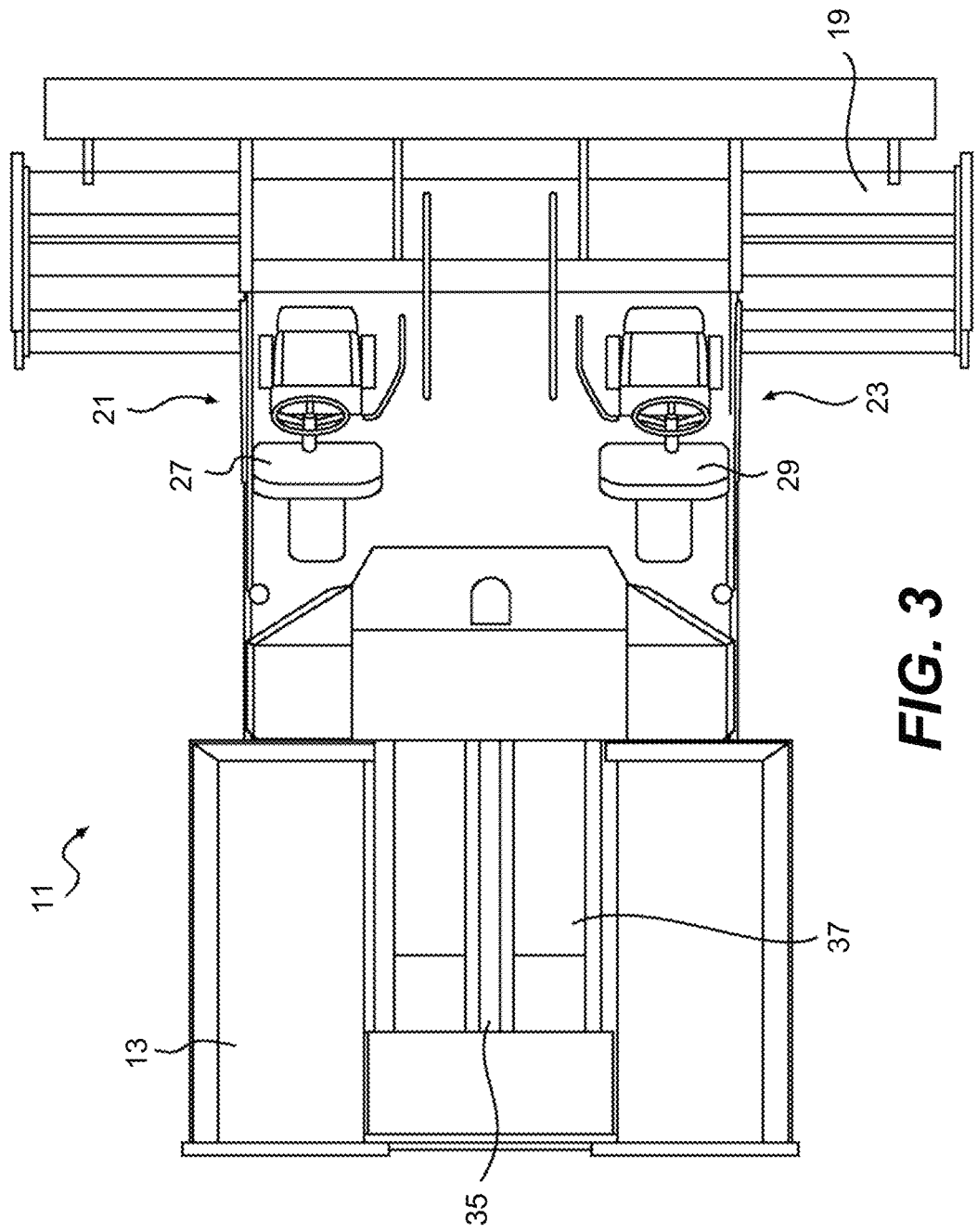
FIG. 3 illustrates an overhead view of a paving machine according to one or more aspects of the disclosed subject matter.

FIG. 3 shows an overhead view of a paving machine 11. In the disclosed embodiment, a hopper 13 includes a conveyor system 35 that feeds asphalt through a passage (e.g., a tunnel) in hopper 13 to a work surface (e.g., work surface 17 in FIG. 1). Hopper 13 may be loaded with any known paving material, such as asphalt. Once it is loaded, hopper 13 may be used to store and convey the paving material to surface 17 so a screed 19 can level and shape the asphalt into a layer of paving material. This operation may require components such as conveyor system 35 to move the asphalt to the surface 17 and/or an auger (not shown). In the exemplary embodiment, the operator of paving machine 11 may be able to control at least some of these components from first and second operator stations 21, 23 using control devices 27, 29. Conveyor system 35 may have multiple conveyor belts 37 that are independently controllable. Conveyor belt 37 may be controllable for operating characteristics such as speed and direction.

Figure 4:
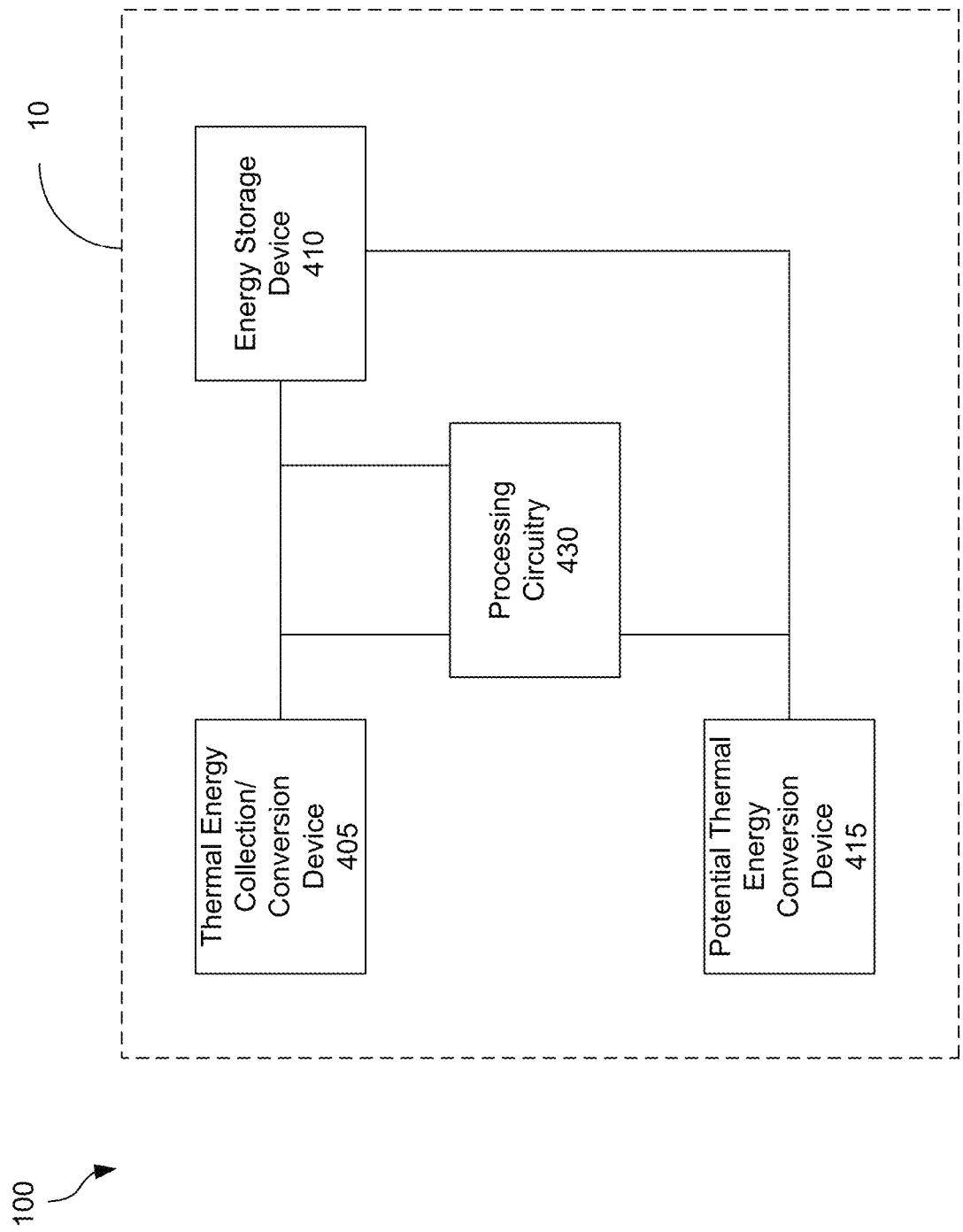
FIG. 4 illustrates an exemplary block diagram of a paving machine having a thermoelectric system according to one or more aspects of the disclosed subject matter.

FIG. 4 illustrates an exemplary block diagram of a system 100 including a paving machine (e.g., paving machine 10 or 11) having a thermoelectric system according to one or more aspects of the disclosed subject matter.

The system 100 can include a paving machine such as the paving machine 10. It should be appreciated that the system 100 can include the paving machine 11 in place of the paving machine 10, so the description will reference paving machine 10 for simplicity. The paving machine 10 can include a thermal energy collection/conversion device 405, an energy storage device 410, a potential thermal energy conversion device 415, and a processor or processing circuitry 430 (which can include internal and/or external memory).

The thermal energy collection/conversion device 405 can represent one or more thermal energy collection/conversion devices electrically connected to one or more of the energy storage device 410, the potential thermal energy conversion device 415, and the processing circuitry 430. In one aspect, the thermal energy collection/conversion device 405 can correspond to a thermoelectric generator. It should be appreciated that thermal energy collection/conversion device 405 and thermoelectric generator 405 can be used interchangeable herein. A thermoelectric generator (TEG), also called a Seebeck generator, is a solid-state device that converts heat flux (temperature differences) directly into electrical energy through a phenomenon called the Seebeck effect (a form of thermoelectric effect). Thermoelectric generators can include the junction of two dissimilar materials and the presence of a thermal gradient. Additionally, large voltage outputs can be possible by connecting many junctions electrically in series and thermally in parallel. In other words, thermally parallel can refer to the alternating p & n-type semiconductors being placed thermally in parallel to each other so that the two pieces of semiconductor are both paths for heat flowing left or right, for example. Thermoelectric generators can also be coupled with heat sinks to improve the thermal gradient.

The energy storage device 410 can correspond to one or more energy storage devices electrically connected to one or more of the thermoelectric generator 405, the potential thermal energy conversion device 415, and the processing circuitry 430. In one aspect, the energy storage device 410 can be one or more batteries. It should be appreciated that energy storage device 410 and battery 410 can be used interchangeably herein.

The potential thermal energy conversion device 415 can correspond to one or more potential thermal energy conversion devices electrically connected to the thermoelectric generator 405, the energy storage device 410, and the processing circuitry 430. In one aspect, the potential thermal energy conversion device 415 can be configured to convert thermal energy at a location that is not at the thermoelectric generator 405. As a result, the potential thermal energy conversion device 415 can convert energy created by the thermoelectric cells and create the correct DC or AC current needed in the system 100.

The processor/processing circuitry 430 can carry out instructions to perform or cause performance of various functions, operations, steps, or processes of the system 100. In other words, the processor/processing circuitry 430 can be configured to receive output from and transmit instructions to the one or more other components in the system 100 to operate the system 100 to charge the energy storage device 410 using the electrical energy generated by one or more of the thermoelectric generator 405 and the potential thermal energy conversion device 415.

Generally, the system 100 can use the thermoelectric generator 405 and/or the potential thermal energy conversion device 415 to charge the battery 410 of the paving machine 10. In one aspect, the paving machine 10 can be a fully electric vehicle such that the battery 410 powers the paving machine 10 in place of a traditional combustion engine.

More specifically, the system 100 can place a plurality of thermoelectric generators 405 on areas of the paving machine 10 that consistently generate heat, such as areas of the paving machine 10 that are in contact with hot asphalt. For example, several areas of the paving machine 10, such as hoppers, tunnels, and screed plates stay hot for extended periods of time because these areas are in contact with the hot asphalt. In a non-limiting example, the hot asphalt may leave the plant from which it was ordered at 300+ degrees Fahrenheit and arrives at the paving machine 10 at about 280 degrees Fahrenheit. It should be appreciated that reference herein to hot asphalt refers to the asphalt being hot enough (e.g., about 280 degrees Fahrenheit when it reaches the paving machine) to be used by the paving machine as would be known by one of ordinary skill in the art. The temperature of the areas in contact with the hot asphalt can be maintained for extended periods of time as more hot asphalt arrives to replenish the supply. The heat can be recovered from these areas and converted to electrical energy by placing the thermoelectric generators 405 on the areas of the paving machine 10 that are in contact with hot asphalt, and the electrical energy can be used to trickle charge the battery 410 of the paving machine 10. In one aspect, a plurality of the thermoelectric generators can be placed on each of the areas that are in contact with the hot asphalt. For example, one or more sets of a plurality of thermoelectric generators 405 can be positioned on a first side of the hopper (e.g., hopper 14), a second set of a plurality of thermoelectric generators 405 can be positioned on a screed assembly (e.g., screed assembly 16), and the like as further described herein.

INDUSTRIAL APPLICABILITY

As noted above, the present disclosure relates to a paving machine and, more particularly, to a paving machine having thermoelectric power generation on the paving machine.

Figure 5:
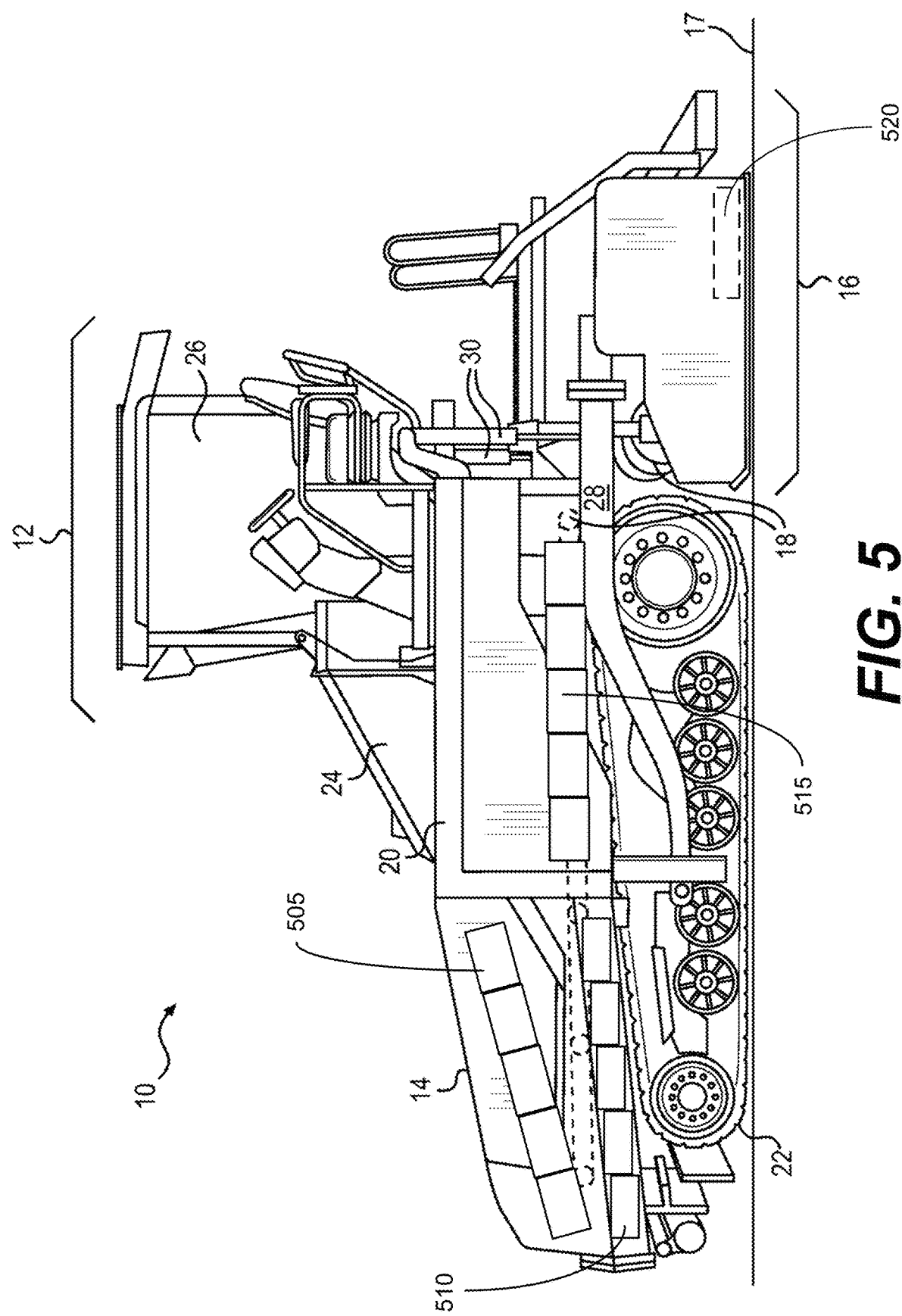
FIG. 5 illustrates a plurality of thermoelectric generators disposed on the paving machine of FIG. 1 according to one or more aspects of the disclosed subject matter.

FIG. 5 illustrates a plurality of thermoelectric generators disposed on the paving machine 10 of FIG. 1 according to one or more aspects of the disclosed subject matter. In one aspect, the paving machine 10 can include one or more sets of thermoelectric generators 405 disposed on the paving machine 10. In other words, each set of thermoelectric generators can include one or more thermoelectric generators 405.

For example, a first set 505 can include a plurality of thermoelectric generators disposed on the hopper 14. Because the hopper 14 contains hot asphalt, the thermoelectric generators 405 disposed on the hopper 14 can generate electrical energy that can be used to charge (and/or trickle charge) the battery 410. In one aspect, trickle charging a battery can refer to delivering a very low voltage. In other words, this means that the battery can be charged slowly over a period of time. It should be appreciated that the first set 505 can be disposed in any position on the hopper 14 that becomes heated for an extended period of time (e.g., due to storing the hot asphalt). In one aspect, one or more of the thermoelectric generators 405 can be placed on a portion of the hopper 14 that is most frequently in contact with the hot asphalt (e.g., an underneath portion of the hopper 14 and/or lower on a side portion of the hopper 14 where the hot asphalt may be stored the longest). The hopper 14 can also include a second set 510 disposed on the hopper 14 wherein the second set 510 includes a plurality of thermoelectric generators 405.

More specifically, in one aspect, the first set 505 and/or the second set 510 can be disposed on an outside of the hopper 14. In other words, the thermoelectric generators 405 of the first and/or second set are disposed opposite the hot asphalt stored in the hopper 14. For example, the hot asphalt is contained in the hopper 14 and hot asphalt maintains contact with an inner portion of the hopper 14. The hot asphalt heats the hopper 14 such that the heat radiates to an outer portion of the hopper 14. As a result, each of the thermoelectric generators 405 can be disposed on the outer portion of the hopper 14 (e.g., opposite the inner portion of the hopper 14) such that the thermoelectric generators 405 are positioned on an outside of the hopper 14 but are in contact with the hopper 14 to take advantage of the heat generated by the hopper 14. It should be appreciated that the thermoelectric generators 405 of the first set 505 and the second set 510 can be disposed in any other locations on the hopper 14 that are heated by the hot asphalt. For example, the thermoelectric generators 405 could be positioned on the inner portion of the hopper 14 that stores the hot asphalt, a front portion of the hopper 14, a rear portion of the hopper 14, an underneath portion of the hopper 14, and the like as long as the thermoelectric generator 405 is in contact with a portion of the hopper 14 that is being heated by the hot asphalt.

In one aspect, each thermoelectric generator 405 of the first set 505 of thermoelectric generators 405 can individually provide electrical energy to the battery 410. Alternatively, the thermoelectric generators 405 of the first set 505 can be connected electrically in series and thermally in parallel to generate more electrical energy for the battery 410. Connecting the thermoelectric generators electrically in series and thermally in parallel can also be applied to any sets of thermoelectric generators (e.g., third set 515, fourth set 520, fifth set 705, sixth set 710, seventh set 715, eighth set 720, and ninth set 725) described herein that have more than one thermoelectric generator. Additionally, any two or more sets can be connected electrically in series and thermally in parallel.

A third set 515 of thermoelectric generators 405 can be disposed on a conveying system (e.g., the conveying system 18) of the paving machine 10. Conveying system 18 may also transport the asphalt to the work surface via a tunnel. It should be appreciated that one or more thermoelectric generators 405 can be placed around the tunnel because the tunnel will become heated for an extended period of time due to the hot asphalt passing through the tunnel.

A fourth set 520 of thermoelectric generators 405 can be disposed on screed assembly 16. For example, the fourth set 520 can be disposed on top of the screed assembly 16 such that the fourth set 520 is disposed opposite of a portion of the screed assembly 16 that contacts the hot asphalt. An example of the positioning of the fourth set 520 can be seen more clearly in FIG. 6.

Figure 6:
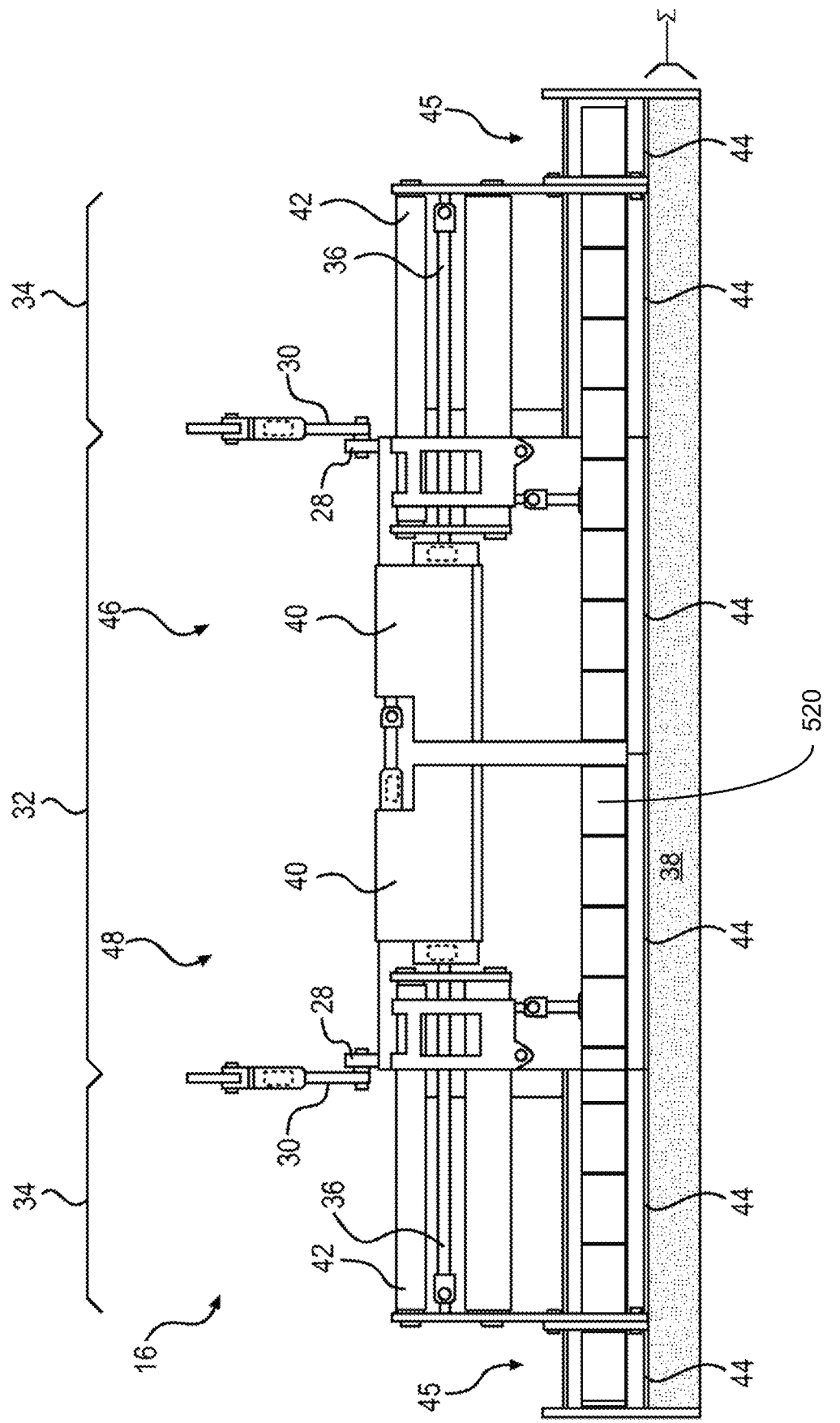
FIG. 6 illustrates a plurality of thermoelectric generators disposed on the screed assembly of FIG. 2 according to one or more aspects of the disclosed subject matter.

FIG. 6 illustrates a plurality of thermoelectric generators disposed on the screed assembly of FIG. 2 according to one or more aspects of the disclosed subject matter. For example, the fourth set 520 can be disposed on the plurality of screen plates 44 of the screed assembly 16.

Figure 7:
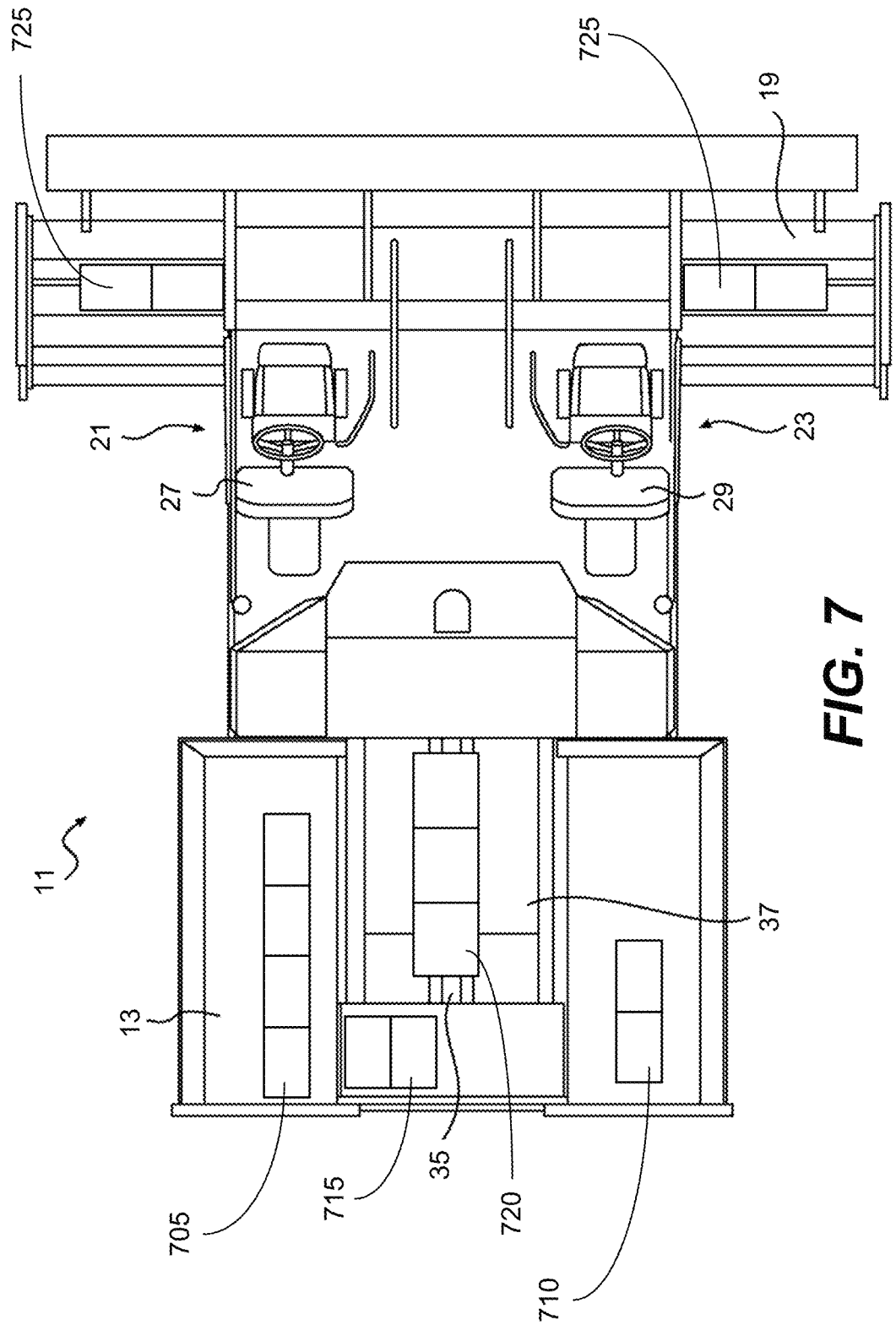
FIG. 7 illustrates a plurality of thermoelectric generators disposed on the paving machine of FIG. 3 according to one or more aspects of the disclosed subject matter.

FIG. 7 illustrates a plurality of thermoelectric generators disposed on the paving machine of FIG. 3 according to one or more aspects of the disclosed subject matter. The paving machine 11 can includes a fifth set 705, a sixth set 710, a seventh set 715, an eighth set 720, and a ninth set 725 of thermoelectric generators 405.

The fifth set 705 and the sixth set 710 of thermoelectric generators 405 can be disposed on the hopper 13. In one aspect, the fifth set 705 and the sixth set 710 of thermoelectric generators 405 can be disposed on the hopper 13 on side portion or on an underneath portion of the hopper 13. Alternatively, or additionally, the fifth set 705 and/or the sixth set 710 can be disposed anywhere on the hopper 13 that becomes heated for an extended period of time (e.g., due to storing the hot asphalt).

The seventh set 715 and eight set 720 of thermoelectric generators 405 can be disposed on a conveyor system (e.g., the conveyor system 35). Conveyor system 35 may also transport the asphalt to the work surface via a tunnel. It should be appreciated that one or more thermoelectric generators 405 can be placed around the tunnel because the tunnel will become heated for an extended period of time due to the hot asphalt passing through the tunnel. In one aspect, the one or more thermoelectric generators 410 can be disposed on an underside of the conveyor belt 37 that is opposite the side of the conveyor belt 37 that is in direct contact with the hot asphalt.

The ninth set 725 of thermoelectric generators 405 can be disposed on a screed (e.g., the screed 19).

It should be appreciated that the number of the sets, the position of the sets, and number of thermoelectric generators illustrated in the sets is exemplary for each of the sets illustrated in the drawings and described herein. For example, any of the sets can themselves include one or more sets and each set can include one or more thermoelectric generators up to any number of thermoelectric generators that can fit on a heated portion of the paving machine 10, 11.

In one aspect, the processing circuitry 430 can also be configured (e.g., as part of a control system) to control the charging in the system 100 to ensure that the one or more batteries 410 would not be overcharged. For example, the processing circuitry 430 can be configured to monitor the charge of the one or more batteries 410 and cause the system 100 to disconnect if no charge was needed. In one aspect, the system 100 disconnecting charging the batteries when no charge is needed can occur automatically in response to a determination that the batteries are fully charged, for example. Alternatively, or additionally, the charging can be manually disconnected as an override automatic control provided by the processing circuitry 430.

Figure 8:
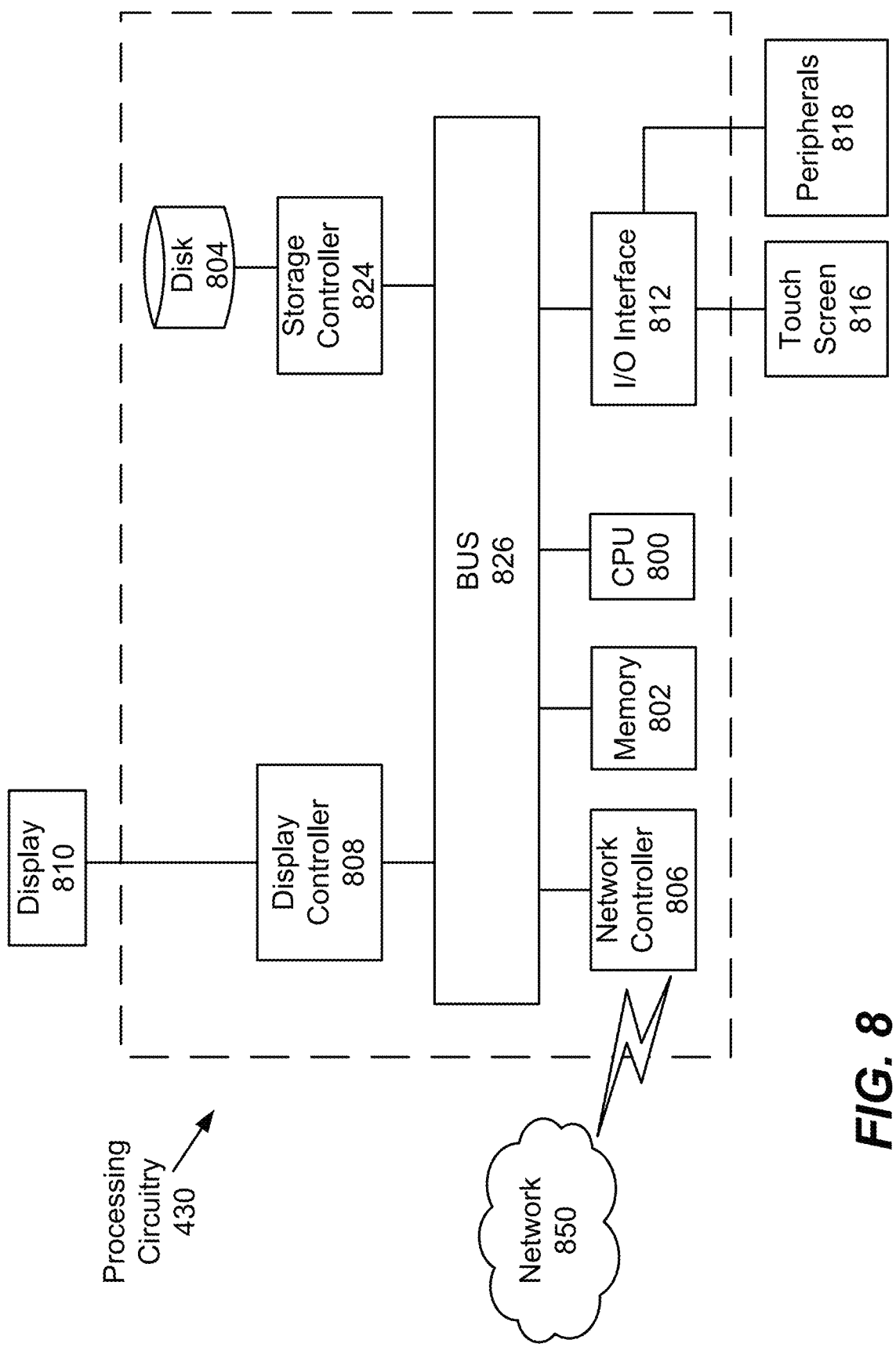
FIG. 8 is a hardware block diagram of processing circuitry according to one or more exemplary aspects of the disclosed subject matter.

Next, a hardware description of processing circuitry 430 according to exemplary embodiments is described with reference to FIG. 8. The hardware description described herein can also be a hardware description of the processing circuitry. In FIG. 8, the processing circuitry 430 includes a CPU 800 which performs one or more of the processes described above/below. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing circuitry 430 communicates, such as a server or computer.

Further, the claimed advancements may be provided as a utility application, background daemon, or component of an operating system, or combination thereof, executing in conjunction with CPU 800 and an operating system such as Microsoft Windows, UNIX, Solaris, LINUX, Apple MAC-OS and other systems known to those skilled in the art.

The hardware elements in order to achieve the processing circuitry 430 may be realized by various circuitry elements. Further, each of the functions of the above described embodiments may be implemented by circuitry, which includes one or more processing circuits. A processing circuit includes a particularly programmed processor, for example, processor (CPU) 800, as shown in FIG. 8. A processing circuit also includes devices such as an application specific integrated circuit (ASIC) and conventional circuit components arranged to perform the recited functions.

In FIG. 8, the processing circuitry 430 includes a CPU 800 which performs the processes described above. The processing circuitry 430 may be a general-purpose computer or a particular, special-purpose machine. In one embodiment, the processing circuitry 430 becomes a particular, special-purpose machine when the processor 800 is programmed to control charging the battery 410 of the paving machine 10 (and any of the processes discussed herein).

Alternatively, or additionally, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

The processing circuitry 430 in FIG. 8 also includes a network controller 806, such as an Intel Ethernet PRO network interface card from Intel Corporation of America, for interfacing with network 850. As can be appreciated, the network 850 can be a public network, such as the Internet, or a private network such as an LAN or WAN network, or any combination thereof and can also include PSTN or ISDN sub-networks. The network 850 can also be wired, such as an Ethernet network, or can be wireless such as a cellular network including EDGE, 3G and 4G wireless cellular systems. The wireless network can also be WiFi, Bluetooth, or any other wireless form of communication that is known.

The processing circuitry 430 further includes a display controller 808, such as a graphics card or graphics adaptor for interfacing with display 810, such as a monitor. A general purpose I/O interface 812 interfaces with a keyboard and/or mouse 814 as well as a touch screen panel 816 on or separate from display 810. General purpose I/O interface also connects to a variety of peripherals 818 including printers and scanners.

The general purpose storage controller 824 connects the storage medium disk 804 with communication bus 826, which may be an ISA, EISA, VESA, PCI, or similar, for interconnecting all of the components of the processing circuitry 430. A description of the general features and functionality of the display 810, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. An electrically powered paving machine, comprising:
a hopper;
a screed assembly;
a conveying system;
one or more batteries configured to power the electrically powered paving machine;
a plurality of thermoelectric generators electrically connected to the one or more batteries;
a potential thermal energy conversion device electrically connected to the one or more batteries; and
processing circuitry, wherein the processing circuitry is configured to control charging the one or more batteries using electrical energy generated by one or more of the plurality of thermoelectric generators and the potential thermal energy conversion device.

2. The electrically powered paving machine of claim 1, wherein the one or more of the plurality of thermoelectric generators are disposed on the hopper.

3. The electrically powered paving machine of claim 2, wherein one or more of the plurality of thermoelectric generators disposed on the hopper is a first set comprising a predetermined portion of the plurality of thermoelectric generators corresponding to at least two of the plurality of thermoelectric generators.

4. The electrically powered paving machine of claim 3, wherein the first set of thermoelectric generators is connected electrically in series and thermally in parallel.

5. The electrically powered paving machine of claim 2, wherein the hopper is configured to be in contact with asphalt having a predetermined heated temperature, wherein the one or more of the plurality of thermoelectric generators disposed on the hopper are configured to convert heat generated by the asphalt to the electrical energy.

6. The electrically powered paving machine of claim 1, wherein one or more of the plurality of thermoelectric generators are disposed on the screed assembly.

7. The electrically powered paving machine of claim 6, wherein the one of more of the plurality of thermoelectric generators disposed on the screed assembly is a second set comprising a predetermined portion of the plurality of the thermoelectric generators corresponding to at least two of the plurality of thermoelectric generators.

8. The electrically powered paving machine of claim 7, wherein the second set of thermoelectric generators is connected electrically in series and thermally in parallel.

9. The electrically powered paving machine of claim 6, wherein the screed assembly is configured to be in contact with asphalt having a predetermined heated temperature, wherein the one or more of the plurality of thermoelectric generators disposed on the screed assembly are configured to convert heat generated by the asphalt to electrical energy.

10. The electrically powered paving machine of claim 1, wherein one or more of the thermoelectric generators are disposed on the conveying system.

11. The electrically powered paving machine of claim 10, wherein the one or more of the plurality of thermoelectric generators disposed on the conveying system is a third set comprising a predetermined portion of the plurality of thermoelectric generators corresponding to at least two of the plurality of thermoelectric generators.

12. The electrically powered paving machine of claim 11, wherein the third set of thermoelectric generators is connected electrically in series and thermally in parallel.

13. The electrically powered paving machine of claim 10, wherein the conveying system is configured to be in contact with asphalt having a predetermined heated temperature, wherein the one or more of the plurality of thermoelectric generators disposed on the conveying system are configured to convert heat generated by the asphalt to electrical energy.

14. A paving machine, comprising:
one or more batteries;
a plurality of thermoelectric generators electrically connected to the one or more batteries;
a potential thermal energy conversion device electrically connected to the one or more batteries; and
processing circuitry, wherein the processing circuitry is configured to control charging the one or more batteries using electrical energy generated by one or more of the plurality of thermoelectric generators and the potential thermal energy conversion device.

15. The paving machine of claim 14, further comprising:
a hopper, a screed assembly, and a conveying system, wherein one or more of the plurality of thermoelectric generators are disposed on one or more of the hopper, the screed assembly, and the conveying system.

16. The paving machine of claim 15, wherein the one or more of the plurality thermoelectric generators disposed on the hopper is a first set comprising a predetermined portion of the plurality of thermoelectric generators corresponding to at least two of the thermoelectric generators, wherein the first set of thermoelectric generators is connected electrically in series and thermally in parallel.

17. The paving machine of claim 15, wherein the one or more of the plurality of thermoelectric generators disposed on the screed assembly is a second set comprising a predetermined portion of the plurality of thermoelectric generators corresponding to at least two of the plurality of thermoelectric generators, wherein the second set of thermoelectric generators is connected electrically in series and thermally in parallel.

18. The paving machine of claim 15, wherein the one or more of the plurality of thermoelectric generators disposed on the conveying system is a third set comprising a predetermined portion of the plurality of thermoelectric generators corresponding to at least two of the thermoelectric generators, wherein the third set of thermoelectric generators is connected electrically in series and thermally in parallel.

19. The paving machine of claim 15, wherein each of the hopper, screed assembly and conveying system is in contact with asphalt having a predetermined heated temperature, wherein each of the plurality of thermoelectric generators disposed on the hopper are configured to convert heat generated by the asphalt to electrical energy.

20. A thermoelectric generation system, comprising:
a paving machine electrically powered by one or more batteries;
a plurality of thermoelectric generators electrically connected to the one or more batteries and constructed to convert heat from heated asphalt loaded on the paving machine into electrical energy; and
processing circuitry, wherein the processing circuitry is configured to control charging the one or more batteries using electrical energy generated by one or more of the plurality of thermoelectric generators.

* * * * *